UNITED STATES PATENT OFFICE.

DAVID GRIFFITHS, OF EGYPT, PENNSYLVANIA.

MANUFACTURE OF HYDRAULIC CEMENT.

SPECIFICATION forming part of Letters Patent No. 311,895, dated February 10, 1885.

Application filed June 14, 1884. (No specimens.)

*To all whom it may concern:*

Be it known that I, DAVID GRIFFITHS, of Egypt, Lehigh county, in the State of Pennsylvania, have invented a certain new and useful Improvement in the Manufacture of Hydraulic Cement, of which the following is a specification.

Among the cement-rocks and hydraulic limestones of this country are to be found rocks which when calcined in the ordinary way for the production of natural "home-made" hydraulic cements, or even when calcined beyond that point, produce either a hot quick-setting cement or an inferior quality of lime. On this account many of these rocks are discarded in manufacturing cement, or when used produce a cement of inferior quality. With a view of obviating this difficulty it has been proposed to mix with calcined rocks of this character a raw cement-rock or other raw rocks either before or after the grinding operation. This raw rock, however, is an inert element, and so far from improving the cement it reduces its strength and impairs its quality.

I have discovered that the cement-rocks and hydraulic limestones above referred to can be made entirely available for the production of a good hydraulic cement by combining with them after calcination, and either before or during or after the grinding operation, not raw rock alone, but raw rocks containing silica, preferably slates or argillo-calcareous limestones, in conjunction with slaked lime. Under these conditions the raw cement-rock is no longer inert, but is active, combining with the slaked lime to form a hydro-silicate of lime, which enhances materially the quality of the cement, the result being that in this way I am enabled to produce from the rocks above referred to a slow-setting hydraulic cement of uniform character and quality and of great tensile strength.

One way of carrying my invention into practical effect is as follows: I take cement-rocks and hydraulic limestones of the kind above referred to and calcine or burn them in the manner ordinarily practiced for the production of natural home-made hydraulic cements. I then add to these calcined rocks about five to seven and one-half per cent. of raw cement-rock and two and one-half to five per cent. of slaked lime. The addition of these ingredients may be effected either before, during, or after the operation of grinding the calcined rocks to a powder. If the addition is made after the grinding operation, the raw cement-rock is of course preliminarily reduced to a powder before being added with the slaked lime to the powdered calcined rock; and in any event all the ingredients should be mixed thoroughly together, so as to make a homogeneous mass. The product thus obtained is an excellent cement of uniform quality, slow-setting, and very strong.

I do not confine myself to the exact proportions hereinbefore stated, since the same may be varied somewhat without material departure from my invention.

What I claim as new, and desire to secure by Letters Patent, is—

1. The hereinbefore-described improvement in the manufacture of hydraulic cement, which consists in incorporating with calcined cement-rocks or hydraulic limestones of the kind indicated raw cement-rocks and slaked lime, substantially in the proportions and in the manner set forth.

2. The hereinbefore-described improvement in the manufacture of hydraulic cement, which consists in incorporating with the calcined cement-rocks or hydraulic limestones of the kind indicated raw rocks containing silica, and slaked lime, substantially in the manner set forth.

In testimony whereof I have hereunto set my hand this 12th day of June, 1884.

DAVID GRIFFITHS.

Witnesses:
   A. DEGACHLINE,
   OLIVER J. FRANTZ.